United States Patent [19]

Hope

[11] 4,401,366

[45] Aug. 30, 1983

[54] POWDER FILLED FIBER OPTIC CABLE

[75] Inventor: Tomasz S. Hope, Kanata, Canada

[73] Assignee: Northern Telecom Limited, Montreal, Canada

[21] Appl. No.: 259,009

[22] Filed: Apr. 30, 1981

[51] Int. Cl.³ .............................................. G02B 5/16
[52] U.S. Cl. ................................................ 350/96.23
[58] Field of Search ......................... 350/96.23, 96.34; 174/118, 96, 98

[56] References Cited

U.S. PATENT DOCUMENTS

| | | | |
|---|---|---|---|
| 3,538,235 | 11/1970 | Arendt et al. | 174/118 X |
| 4,259,540 | 3/1981 | Sabia | 350/96.23 X |
| 4,273,597 | 6/1981 | Garner et al. | 174/118 X |
| 4,324,453 | 4/1982 | Patel | 350/96.23 |
| 4,331,379 | 5/1982 | Oestreich et al. | 350/96.23 |
| 4,333,706 | 6/1982 | Davis et al. | 350/96.23 |

FOREIGN PATENT DOCUMENTS 1101551 3/1961 Fed. Rep. of Germany ...... 174/118

OTHER PUBLICATIONS

Bresser, "Waterblocking in Optical Cables," *Proc. of 29th Int. Wire & Cable Symposium,* Cherry Hill, N.J., Nov. 1980, pp. 290-298.

*Primary Examiner*—John D. Lee
*Attorney, Agent, or Firm*—R. J. Austin

[57] ABSTRACT

Optical cable in which an optical waveguide within a protective sheath is in contact with a mixture of hydrophilic and hydrophobic powders, the hydrophilic powder being non-swellable and forming a viscous solution in contact with water to prevent ice crystal formation.

20 Claims, 3 Drawing Figures

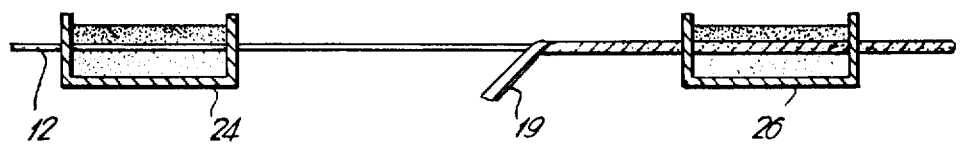
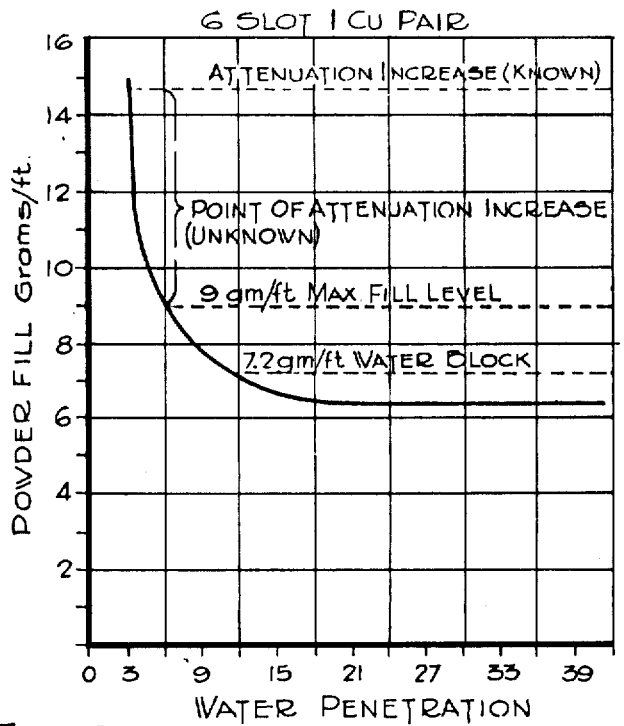
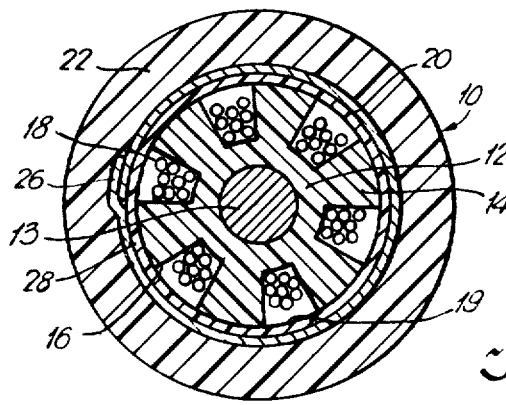

POWDER FILLED FIBER OPTIC CABLE

This invention relates to optical cable.

Optical cables are now being used for telecommunication purposes as replacements for conventional cables using electrical conductors. These optical cables comprise optical waveguides housed within protective sheaths to protect them from damage which may be caused by surrounding physical or environmental conditions. These protective sheaths hence form protection against crushing or cutting into the waveguides by hard objects such as rocks as such damage directly increases the attenuation of the waveguides.

While the presence of water within an optical cable is not detrimental to the performance of waveguides, passage of the water along the inside of cable should be prevented as its presence at connection points or terminals may cause problems. More importantly, the formation of and retention of ice around the waveguides creates a crushing effect which is known to increase the attenuation to very serious proportions. Thus, the protective sheaths must also be water impermeable to prevent or minimize ingress of water. However, even when efforts are made to prevent water ingress, sheath damage may provide pathways for water into cable and upon freezing, attenuation problems will still result. Thoughts have been given, therefore, to the provision of a means which will prevent the crushing action of ice upon the waveguides by the formation of ice, but attempts to solve the problem have so far been unsuccessful.

The present invention is concerned with an optical cable having a medium within its sheath which successfully prevents the crushing problem upon waveguides in the presence of water when the temperature drops below freezing.

Accordingly, the present invention provides an optical cable comprising at least one optical waveguide, a protective sheath surrounding the waveguide, and a mixture of a hydrophobic and hydrophilic powder within the sheath and contacting the waveguide, the hydrophilic powder in contact with water being substantially non-swellable and forming a viscous solution and preventing the formation of ice crystals.

With the above invention, the formation and expansion of a solid mass of ice is prevented and crushing of the waveguides does not occur.

One particular hydrophilic powder is a high molecular weight resin which may be an anionic polyacrylamide resin. This may have an average molecular weight between $2.5 \times 10^6$ and $7 \times 10^6$ and with between 12% and 28% acrylamide groupings which have been converted to acrylic acid groupings. The acrylic acid groupings prevent destabilization of the viscous solution when the water is not pure as under such circumstances the polyacrylamide would itself be unstable. Suitable materials are sold under the trade name "Separan" by Dow Chemical Corporation or under the name "Magnifloc" by Cyanimid Company. Alternatively to the acrylic acid groupings, the polyacrylamide resin may be crosslinked by irradiation to increase its molecular weight.

As further alternatives, the resin is an irradiated crosslinked polyethylene oxide or the resin is a hydrolized starch graft polymer of polyacrylonitrile.

The hydrophobic powder is preferably calcium carbonate surface treated with a hydrophobic material. The calcium carbonate itself is inert but when surface treated, the powder acts in hydrophobic fashion. The surface treatment is preferably by way of a coating of a water repellent long chain fatty acid or modified fatty acid selected from the group consisting of lauric acid, myristic acid, palmitic acid, stearic acid and arachidic acid. Alternatively, the hydrophobic powder is inherently hydrophobic and is not surface coated. It has been discovered that for any given cable construction, a determinable amount of the powder, to provide a given density, may be used and the coaction of the powder with water does not cause noticable crushing of the optical waveguide. On the other hand, the powder is soluble in water to cause a viscosity build-up and, it is believed, that ice crystal formation is prevented because the water penetration in this viscous system, is in the form of microbore channels which break up the ice crystals as they tend to form. Whatever is the true explanation may not be known, but the effect is, remarkably, that a solid ice block does not form and no crushing of the waveguide takes place when the viscous solution becomes frozen.

As already stated, the amount of powder, i.e. its density, is determinable for any particular cable design and this determination may be made experimentally. If too much powder is included, this will result in dry powder itself crushing the waveguide and causing an attenuation increase. Alternatively, if too little powder is used, then ice formation into a solid block will not be prevented and the ice will crush the waveguide. It is found that the use of the two powders together enables the desired requirements of the invention to be obtained without completely filling the spaces around the waveguide with powder whereby the crushing effect by dry powder is avoided.

The hydrophobic powder is instrumental in blocking further penetration by water along the cable after the hydrophilic powder has formed into a viscous solution in contact with the water whereby water penetration into the cable is restricted. Suitable proportions of the materials to provide a viscous solution to prevent ice block formation and to restrict penetration of water into the cable, lie between 5% and 30% of the hydrophilic powder and between 95% and 70% of the hydrophobic powder.

The use of the hydrophilic powder and hydrophobic powder is particularly suitable for an optical cable in which a plurality of optical waveguides are housed within grooves provided in a central core, the powder occupying the voids in the grooves.

The invention also includes a method of making an optical cable having optical waveguides extending along grooves provided within a core, wherein after the waveguides have been located within the grooves, a mixture of a hydrophilic and hydrophobic powder is placed within the grooves in contact with the waveguides prior to the provision of a protective sheath, the hydrophilic powder in contact with water being substantially non-swellable and forming a viscous solution to prevent formation of ice crystals.

In a preferred method, the core with the waveguides located in the grooves is passed through a fluidized bed of the powder to powder fill the grooves, that is the core is passed beneath the fluidized surface of the bed and powder flows into the grooves and around the waveguides by reason of its fluid flow characteristics. Thus, this process is distinct from an electrostatic process in which particles are electrostatically attracted from a fluidized bed onto the surface of an article disposed over the bed. An electrostatic process is unsuitable for present requirements because it would not result in filling of the grooves but merely in covering the groove surfaces and waveguide surfaces.

It is found that the powder flowing into the grooves by the fluidized bed process, remains substantially completely within the grooves for a short time after removal of the core from the bed, such time being sufficient to locate a covering material, e.g. a core wrap around the core so as to prevent the powder from leaving the grooves. This is surprising in view of the fact that some of the grooves are downwardly facing and may have openings at the core surface which are around 3 mm wide. Any powder which does drop from the lower grooves drops onto the core wrap which then replaces the powder in the grooves as it is raised against the core preparatory to wrapping.

One embodiment of the invention will now be described with reference to the accompanying drawings, in which:

FIG. 1 is a cross-sectional view of an optical cable according to the embodiment;

FIG. 2 is a graph illustrating the effect of different quantities of powder in the cable of the embodiment; and FIG. 3 is a diagrammatic side elevational view of apparatus used in the construction of the cable.

As shown in FIG. 1, an optical cable 10 comprises a crush resistant core 12 surrounding a crush resistant strength member 13, the core having been formed from extruded plastics material such as high density polyethylene. The core is extruded with a plurality, i.e. six, circumferentially spaced ribs 14 which extend longitudinally of the core. The ribs may be strictly axial or helically formed. The ribs have circumferentially wide outer ends and define tapering grooves 16 between them. These grooves may be up to 3 mm or more in circumferential width and have a base diameter of about 6 mm. The outside diameter of the ribs is approximately 10 mm.

Each of the grooves 16 carries a plurality of optical waveguides 18 which are sufficiently loosely contained therein to avoid any external pressure upon the waveguides, created by heat expansion or shrinkage of the cable, such as may increase the attenuation of the waveguides.

The cable structure is as described in greater detail in copending United States patent application Ser. No. 194,447 filed Oct. 6, 1980 in the name of R. J. Williams and entitled "Optical Cable" (now U.S. Pat. No. 4,361,381) in that a core wrap 19 of 0.003 mm thick polyester and protective sheath comprising a metal inner layer 20 and an outer water impermeable polymeric layer 22 are provided around the core and waveguides.

Additionally, however, the present embodiment includes, according to the invention, a mixture of hydrophilic powder and a hydrophobic powder within each of the grooves. This material is composed of a hydrophilic powder which is high molecular weight polyacrylamide powder, e.g. as sold under the trade name "Separan" by Dow Chemical Corporation, in admixture with a hydrophobic powder such as calcium carbonate powder, the particles of which are surface coated with stearic acid which provides the hydrophobic properties to the powder.

As will now be discussed, in the event that moisture or water penetrates through the sheath to occupy the grooves, the polyacrylamide powder prevents the waveguides from being subjected to compression by any ice formed upon lowering in temperature whereby attenuation in each of the waveguides is not increased. This effect is thought to be rather surprising in view of the fact that it may be considered that the hydrophilic powder itself would assist in the compressive force applied by the ice. However, if the amount of the powder mixture per unit volume of the grooves is controlled, i.e. its density, then the required degree of prevention in increase in attenuation is achieved. The hydrophobic powder, is used for the purpose of blocking the advance of water along the cable whereby the water is localized at or around its point of entry. It is determined that suitable proportions of the hydrophilic and hydrophobic materials to provide a viscous solution to prevent ice block formation and to restrict penetration of water along the cable may lie between 5% and 30% of the hydrophilic material and, correspondingly, between 95% and 70% of the hydrophobic material. The percentages chosen are dependent upon what is most suitable for particular requirements of cable design and this may be determined experimentally. The final dry density of the powder within the grooves depends upon the percentage of hydrophilic powder being used in the mixture suitable for prevention of the ice crushing effect upon the waveguides. Hence, this final density is partly determinable by any actual mix ratio that is decided upon.

As an example of the above, FIG. 2 is a graph showing the effect upon the effectiveness of water blockage in the cable of the first embodiment with the use of different densities of powder fill in the grooves. The density is expressed as weight is grams/ft run along the cable.

To determine the values for the graph, various lengths of cable were filled with different densities of the powder mixture. The mixture was the same in each case and consisted of 20% of polyacrylamide powder and 80% of calcium carbonate coated with stearic acid. A measured sample (e.g. one foot length) was taken from each length and was weighed, and the sample separated into its constituent parts to remove the powder and the parts were weighed to thereby obtain the weight of the powder per unit length.

Each length of cable was then subjected to a water blocking test which involved the removal of a portion of the sheath and core wrapping, location of a watertight gland across the exposed core while sealing against the layer 22 at each side of the removed portion of sheath, and subjecting the exposed core to a 3 foot head of water applied directly within the gland. After a specified time, each cable length was opened to determine the distance travelled by the water from the gland.

As shown in FIG. 2, water penetration was clearly less in cable lengths using more powder per unit length of cable. This is to be expected because of the greater amounts of hydrophilic and hydrophobic powder used. Also, as the curve shows, the degree of water penetration increased disproportionately to the decrease in powder weight per unit length until at about 6.5 gm/ft of powder, the hydrophobic powder was incapable of forming an effective seal and water penetrated along the cable as far as the quantity of water would cause it to pass. An effective block for water occurred at a minimum powder content of about 7.2 gm/ft. On the other hand, if the density of the powder was increased too far, it could cause compacting of the filling medium and a compressive load to be applied to the waveguides in the dry powder state whereby there was a noticeable and undesirable increase in the attenuation of the waveguides. It was determined that up to a weight of powder of about 9 gm/ft length, the attenuation was either not noticeable or was acceptable. Up to this weight, the powder mixture also prevented the normal block formation of ice down to a temperature of −40° C. whereby the ice itself also applied insufficient pressure to the waveguides to deleteriously affect the attenuation. Severe overfilling caused compacting of the filling medium and this in itself increased the pressure on the fiber and caused an attenuation increase.

Hence, the above test shows that with the particular cable described in this embodiment and with a powder mix of 20% polyacrylamide and 80% calcium carbonate, a measure of between 7 and 9 gm/ft of powder was effective in water blocking the cable while also preventing the waveguide attenuation from increasing to unacceptable levels. With different precentages of the powder materials and different cable structures, the useful operating range of powder weights may change. This is, however, easily determinable experimentally and perhaps by the method described above.

The cable is powder filled in the following manner.

As shown by FIG. 3, the cable core 12 with the waveguides located in the grooves 16 is passed through a fluidized bed 24 of the powder mixture. The core is passed beneath the defined upper surface of the bed so as to be immersed within the powder itself. This is distinct from passage of the core above the bed which would entail the use of means, such as electrostatic attraction, to lift particles from the bed towards the core surface. In the process of the embodiment, the use of electrostatic forces is avoided. It is found that the powder in the bath flows as a liquid to fill the grooves and thus surround the waveguides. The density of fill for the grooves may be changed by changing the throughput speed of the core in the bed until the desired density is obtained.

Upon leaving the bed, the core is immediately wrapped with the core wrap 19 as shown in FIG. 3. This is done by conventional means and will be described no further. There is a surprising effect with this powder fill process, however, and that is that although the grooves have openings about 3 mm wide, no significant amount of powder falls from the grooves before the core wrap is applied. This is even the case with the grooves which lie undermost and open downwardly. If powder from the lower grooves does fall out, it is caught upon the approaching core wrap and re-inserted in the grooves upon core wrap application.

After the core wrap is applied, it is passed through another fluidized bed 26. The particular core wrap used has a lint type exterior surface, i.e. one which is a fluffy or matt finish. This surface is capable of absorbing and holding a surrounding layer of powder around the core wrap to provide an initial barrier to water penetration within the shield. The metal inner layer 20 and polymeric layer 22 are then applied by means not shown, but which are conventional in the manufacture of electrical cable.

What is claimed is:

1. An optical cable comprising at least one optical waveguide, a protective sheath surrounding the waveguide, and a mixture of a hydrophilic and hydrophobic powder within the sheath and contacting the waveguides, the hydrophilic powder in contact with water being substantially non-swellable and forming a viscous solution and preventing the formation of ice crystals.

2. An optical cable according to claim 1, wherein the hydrophilic powder is from 5% to 30% by weight of the total weight of the mixture and the hydrophobic powder is correspondingly from 95% to 70% by weight.

3. An optical cable according to either of claims 1 and 2 wherein the hydrophilic powder is a high molecular weight resin.

4. An optical cable according to claim 3, wherein the resin is an anionic polyacrylamide resin.

5. An optical cable according to claim 4, wherein the resin has an average molecular weight between $2.5 \times 10^6$ and $7 \times 10^6$ and between 12% and 28% acrylamide groupings which have been converted to acrylic acid groupings.

6. An optical cable according to claim 3, wherein the resin is a hydrolized starch graft polymer of polyacrylonitrile.

7. An optical cable according to claim 3, wherein the resin is an irradiated crosslinked polyethylene oxide.

8. An optical cable according to either claim 1 or claim 2, wherein the hydrophobic powder is calcium carbonate surface treated with a hydrophobic material.

9. An optical cable according to claim 8, wherein the calcium carbonate is surface treated with a coating of a water repellent long chain fatty acid or a modified fatty acid selected from the group consisting of lauric acid, myristic acid, palmitic acid, steric acid and arachidic acid.

10. An optical cable according to claim 1, wherein the hydrophilic powder is a high molecular weight resin and the hydrophobic powder is calcium carbonate surface treated with a hydrophobic material, the mixture consisting of from 5% to 30% by weight of the hydrophilic powder and of from 95% to 70% by weight of the hydrophobic powder by weight of the total mixture.

11. An optical cable comprising a crush resistant core formed with a plurality of circumferentially spaced, longitudinally extending ribs defining grooves between them, a plurality of optical waveguides within and extending along the grooves and a protective sheath surrounding the core and waveguides, the grooves also containing a mixture of a hydrophilic and hydrophobic powder in contact with the waveguides, the hydrophilic powder in contact with water being substantially non-swellable and forming a viscous solution and preventing the formation of ice crystals.

12. An optical cable according to claim 11, wherein the hydrophilic powder is from 5% to 30% by weight of the total weight of the mixture and the hydrophobic powder is correspondingly from 95% to 70% by weight.

13. An optical cable according to either of claims 11 and 12 wherein the hydrophilic powder is a high molecular weight resin.

14. An optical cable according to claim 13, wherein the resin is an anionic polyacrylamide resin.

15. An optical cable according to claim 14, wherein the resin has an average molecular weight between $2.5 \times 10^6$ and $7 \times 10^6$ and between 12% and 28% acrylamide groupings which have been converted to acrylic acid groupings.

16. An optical cable according to claim 13, wherein the resin is a hydrolized starch graft polymer of polyacrylonitrile.

17. An optical cable according to claim 13, wherein the resin is an irradiated crosslinked polyethylene oxide.

18. An optical cable according to either claim 11 or claim 12, wherein the hydrophobic powder is calcium carbonate surface treated with a hydrophobic material.

19. An optical cable according to claim 18, wherein the calcium carbonate is surface treated with a coating of a water repellent long chain fatty acid or a modified fatty acid selected from the group consisting of lauric acid, myristic acid, palmitic acid, stearic acid and arachidic acid.

20. An optical cable according to claim 11, wherein the hydrophilic powder is a high molecular weight resin and the hydrophobic powder is calcium carbonate surface treated with a hydrophobic material, the mixture consisting of from 5% to 30% by weight of the hydrophilic powder and of from 95% to 70% by weight of the hydrophobic powder by weight of the total mixture.

* * * * *